United States Patent
Lee et al.

(10) Patent No.: US 7,580,091 B2
(45) Date of Patent: *Aug. 25, 2009

(54) LIGHT GUIDING APPARATUS, BACKLIGHT ASSEMBLY AND LIQUID CRYSTAL DISPLAY DEVICE HAVING THE SAME

(75) Inventors: Sang-Duk Lee, Yongin-si (KR); Jung-Tae Kang, Suwon-si (KR); Kyu-Seok Kim, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 344 days.

This patent is subject to a terminal disclaimer.

(21) Appl. No.: 11/548,062

(22) Filed: Oct. 10, 2006

(65) Prior Publication Data
US 2007/0127260 A1    Jun. 7, 2007

Related U.S. Application Data

(62) Division of application No. 10/449,144, filed on May 29, 2003, now Pat. No. 7,133,092.

(30) Foreign Application Priority Data
Jul. 9, 2002    (KR) ............................... 2002-39810

(51) Int. Cl.
*G02F 1/1335* (2006.01)
(52) U.S. Cl. .................... 349/64; 349/61; 349/112
(58) Field of Classification Search .......... 349/61–71
See application file for complete search history.

(56) References Cited

U.S. PATENT DOCUMENTS

| 5,477,422 | A | 12/1995 | Hooker et al. | |
|---|---|---|---|---|
| 6,174,064 | B1 | 1/2001 | Kalantar et al. | |
| 7,081,933 | B2 * | 7/2006 | Yu et al. | 349/62 |
| 7,133,092 | B2 * | 11/2006 | Lee et al. | 349/64 |

FOREIGN PATENT DOCUMENTS

| CN | 1327161 | 12/2001 |
|---|---|---|
| JP | 10-188642 | 7/1998 |
| KR | 1999023490 | 3/1999 |

OTHER PUBLICATIONS

Merriam Webster's Collegiate Dictionary 10TH Ed. at p. 377 (defining 'emboss'). Copyright 1999.
Chinese Office Action for Chinese Patent Application No. 03147177.3; Dated Nov. 13, 2006.

* cited by examiner

*Primary Examiner*—Dung T. Nguyen
(74) *Attorney, Agent, or Firm*—Cantor Colburn LLP

(57) ABSTRACT

A light guiding plate capable of minimizing a thickness of a backlight assembly and an LCD device, a backlight assembly and an LCD device having the same are provided. The light guiding plate has a light incident surface, a light reflection surface having a plurality of dots for diffusing and reflecting the light emitted from the light incident surface and a light output surface having a predetermined roughness and further diffusing the light diffused and reflected by the light reflection surface. Thus, a conventional diffusion sheet disposed above the light guiding plate may be removed.

13 Claims, 4 Drawing Sheets

LIGHT GUIDING APPARATUS, BACKLIGHT ASSEMBLY AND LIQUID CRYSTAL DISPLAY DEVICE HAVING THE SAME

CROSS REFERENCE TO RELATED APPLICATIONS

This application is a divisional application of U.S. application Ser. No. 10/449,144 filed May 29, 2003, which claims priority to and the benefit of Korean Patent Application No. 10-2002-39810, filed 9 Jul. 2002, both of which are incorporated by reference herein in their entirety.

BACKGROUND OF THE INVENTION

1. Field of the Invention

The present invention relates to a light guiding apparatus, and a backlight assembly and a liquid crystal display having the same, and more particularly, to a backlight assembly and a liquid crystal display having a light guiding apparatus capable of reducing thickness of the backlight assembly and the liquid crystal display.

2. Description of the Related Art

Generally, information processing equipments require a display device to visually display the processed information to users. Liquid crystal display devices have been developed to have full-color and high-resolution functions with light-weight and compact size compared with CRT-type display devices. As a result, the liquid crystal display devices have been widely used as a monitor of a computer, a household wall-mountable television and various information processing devices.

FIG. 1 is a sectional view showing a structure of a liquid crystal display device, and FIG. 2 is a sectional view showing a structure of a diffusion sheet shown in FIG. 1.

As shown in FIG. 1, a liquid crystal display device 80 includes a display unit 50 for displaying images and a backlight assembly 60 for supplying light to the display unit 50.

The display unit 50 has a liquid crystal display panel 59, data and gate printed circuit boards (not shown), and data and gate tape carrier packages (not shown).

The liquid crystal display panel 59 includes a thin film transistor substrate 52, a color filter substrate 54 and liquid crystal (not shown).

The thin film transistor substrate 52 is a transparent glass substrate on which thin film transistors are arranged in a matrix shape. Data lines and gate lines are connected to the sources and the gates of the thin film transistors, respectively. In addition, pixel electrodes are comprised of ITO (Indium Tin Oxide) of transparent conductive material, and are connected to the drains of the thin film transistors.

The color filter substrate 54 is arranged oppositely to the thin film transistor substrate 52. The color filter substrate 54 has RGB pixels. The RGB pixels show predetermined colors when light passes through the RGB pixels, and are formed through a thin film process. Common electrodes, made of ITO, are coated on a surface of the color filter substrate 54.

When an electric power signal is applied to the gate and the source of the thin film transistor, the thin film transistor is activated, and an electric field is formed between the pixel electrodes of the thin film transistor substrate 52 and the common electrodes of the color filter substrate 54. The electric field changes an aligning angle of the liquid crystal disposed between the thin film transistor substrate 52 and the color filter substrate 54. Thus, a transmissivity of the light passing through the liquid crystal is varied depending on the aligning angle of liquid crystal, so that desired images can be displayed.

The backlight assembly 60 is disposed below the display unit 59, and uniformly supplies lights to the display unit 59. The backlight assembly 60 includes a lamp unit 10 for generating a light, a light guiding plate 20, optical sheets 40, and a reflection sheet 30. The light guiding plate 20 changes a path of the light, and guides the light towards the display unit 59. The optical sheets 40 receive the light emitted from the light guiding plate 20, and provide a uniform brightness of light. The reflection sheet 30 is disposed below the light guiding plate 20, and reflects the light leaked from the light guiding plate 20 towards the light guiding plate 20 to improve the efficiency of light.

Although not shown in FIG. 1, the liquid crystal display device 80 further includes a mold frame for sequentially receiving the display unit 59 and the backlight assembly 60, and a top chassis, facing the mold frame and being combined with to the mold frame, for preventing the display unit 59 from being separated from the mold frame.

The optical sheets 40 include a diffusion sheet 42, first and second light-collecting sheets 44 and 46, and a protection sheet 48. The diffusion sheet 42 receives the light emitted from the light guiding plate 20, and provides light having a uniform brightness distribution. The first and second light-collecting sheets 44 and 46 receive the light emitted from the diffusion sheet 42, and collect the light to output the light toward different directions, so that viewing angle is enhanced. The protection sheet 48 is disposed on an upper portion of the second light-collecting sheet 46, and prevents impurities from penetrating into the second light-collecting sheet 46. A scattering agent is added to the diffusion sheet 42 in order that the light emitted from the light guiding plate 20 is diffused to have a uniform brightness distribution.

As shown in FIG. 2, the diffusion sheet 42 has a base layer 42a and a first and second diffusion layers 42b and 42c. The first and second diffusion layers 42b and 42c cover lower and upper layers of the base layer 42a, respectively. A plurality of beads 42d is interposed in the first and second diffusion layers 42b and 42c, so that the diffusion sheet 42 is not closely adhered to the light guiding plate 20.

Since the optical sheets 40 require many sheets (elements), such as the diffusion sheet 42 and the first and second light-collecting sheets 44 and 46, in order to enhance the viewing angle and the brightness characteristic of light, the cost for manufacturing the liquid crystal display device 80 increases, and there is some limits to manufacture the liquid crystal display device 80 having the lighter weight, thinner thickness and compacter size.

SUMMARY OF THE INVENTION

The present invention has been made to solve the above problems.

Therefore, the present invention provides a light guiding apparatus having a light reflection surface with fine dots and a light output surface with a predetermined roughness.

Further, the present invention provides a backlight assembly having the light guiding apparatus capable of reducing the thickness of the backlight assembly by removing some of optical sheets.

Furthermore, the present invention provides a liquid crystal display device having the backlight assembly.

According to one aspect of the present invention, a light guiding apparatus for guiding light comprises: a light incident surface for receiving a first light generated from a light generating part; a light reflection surface including a plurality of dots, a side of the light reflection surface bordering a first side of the light incident surface, and the dots diffusing and reflecting the first light emitted from the light incident surface to output a second light; and a light output surface including a predetermined roughness to diffuse the second light, and a side of the light output surface bordering a second side of the light incident surface.

According to another aspect of the present invention, a backlight assembly comprises: a light generating part for generating a first light; a light guiding member including a light incident surface for receiving the first light generated from the light generating part, a light reflection surface having a first embossing pattern, the first embossing pattern diffusing and reflecting the first light emitted from the light incident surface to output a second light, and a light output surface having a second embossing pattern with a predetermined roughness, the light output surface diffusing the second light; and a brightness controlling member, disposed above the light guiding member, for controlling brightness of the second light guided by the light guiding member.

According to further aspect of the present invention, a liquid crystal display device comprises: a backlight assembly including a light guiding member having a bottom surface, an upper surface, a plurality of dots formed on the bottom surface, and an embossing pattern having a predetermined roughness and being formed on the upper surface, a reflection sheet, disposed below the light guiding member, for reflecting a first light passed through the light guiding member towards the light guiding member, and an optical sheet, disposed above the light guiding member, for controlling a path of a second light guided by the light guiding member; and a liquid crystal panel assembly for displaying an image in response to a third light emitted from the backlight assembly, the liquid crystal panel assembly including a first substrate, a second substrate facing the first substrate and liquid crystal disposed between the first and the second substrates.

According to the light guiding apparatus, the backlight assembly and the liquid crystal display device having the light guiding apparatus, a fine dot pattern is formed on the light reflection surface of the light guiding apparatus for guiding the light emitted from a lamp (lamps), so that the light is diffused and reflected by the fine dot pattern. An embossing pattern having a predetermined roughness is formed on the light output surface of the light guiding apparatus to diffuse light, so that the embossing pattern may replace the conventional diffusion sheet disposed above the light guiding apparatus.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF PREFERRED EMBODIMENTS

Hereinafter, the present invention will be described in detail with reference to accompanying drawings.

Figure 1:
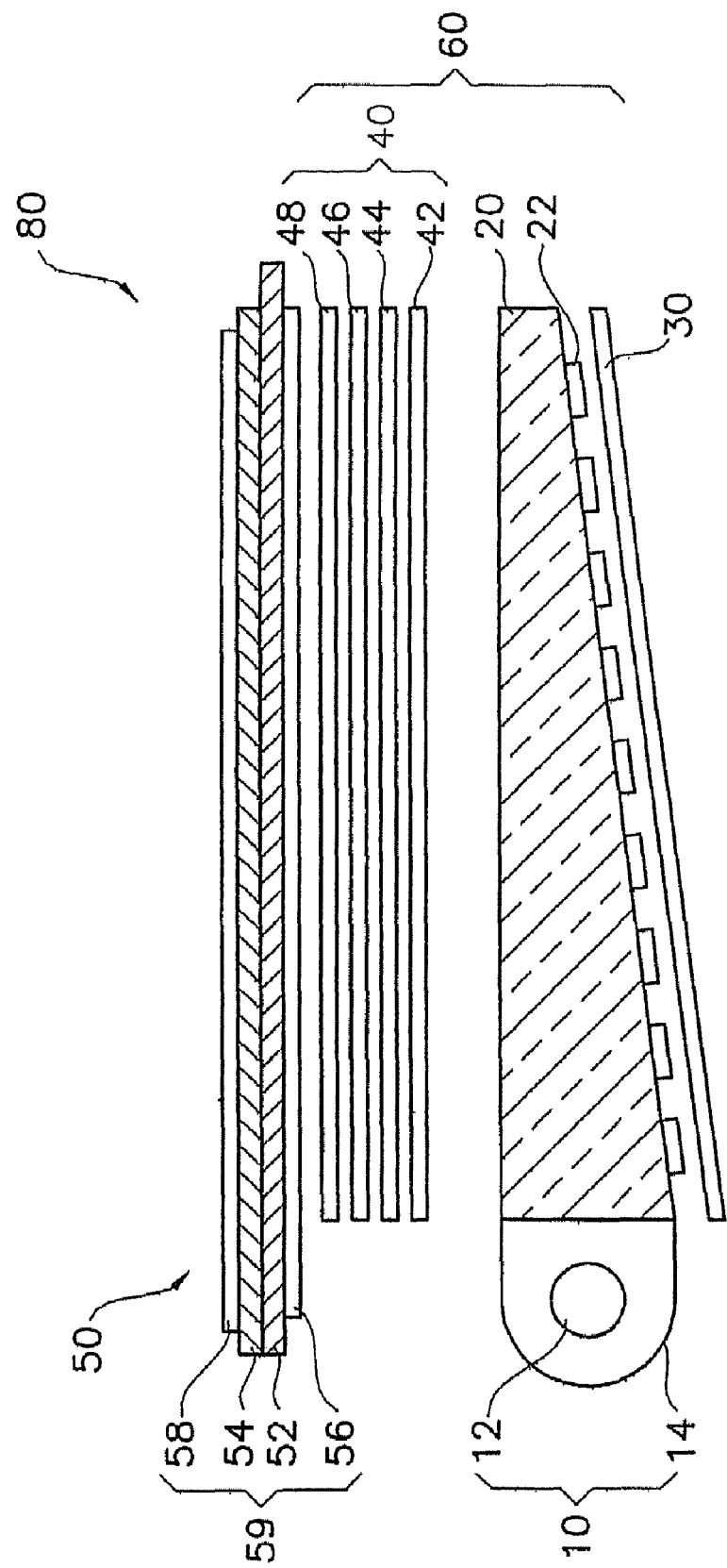
FIG. 1 is a sectional view showing a structure of a conventional liquid crystal display device.
Figure 2:
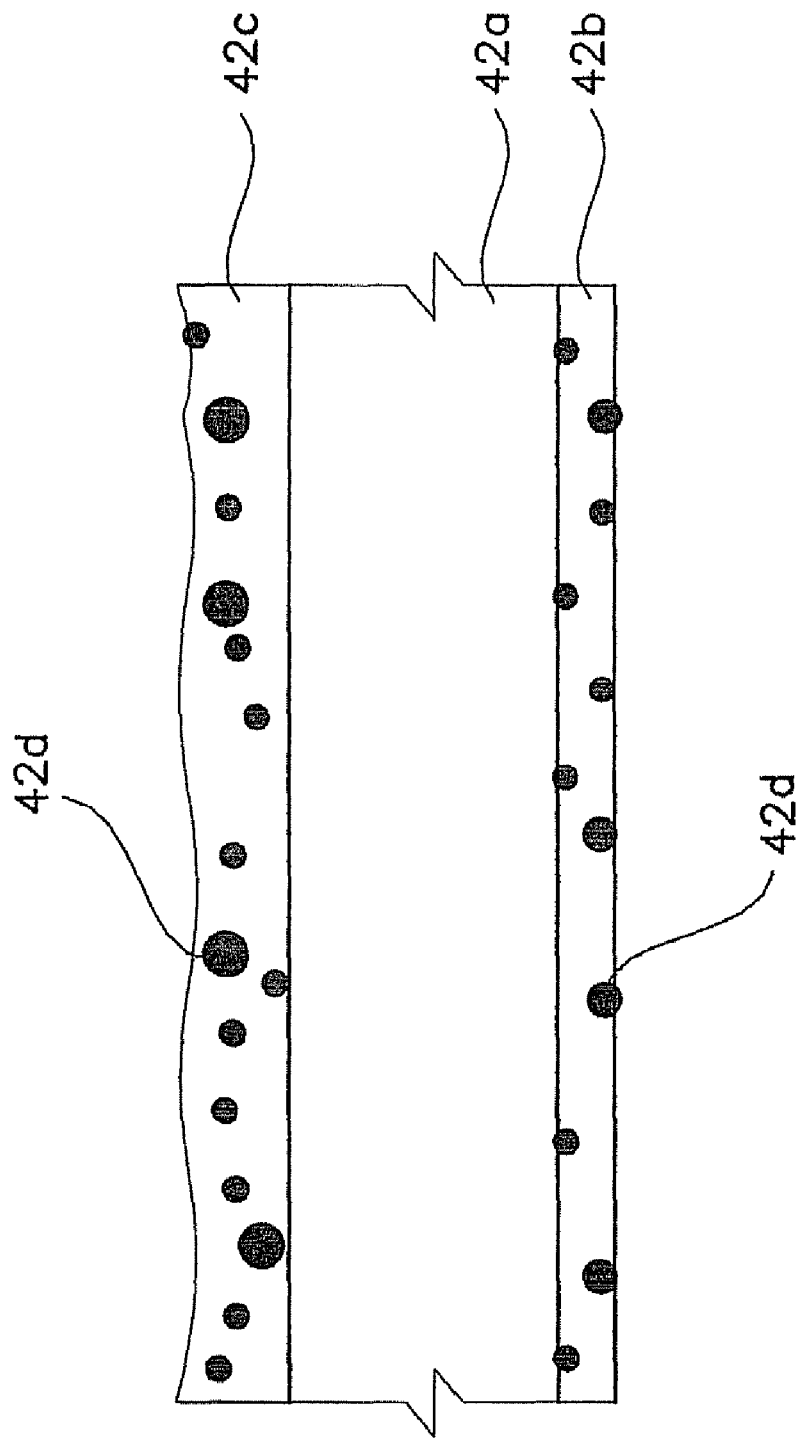
FIG. 2 is a sectional view showing a structure of a diffusion sheet shown in FIG. 1.
Figure 3:
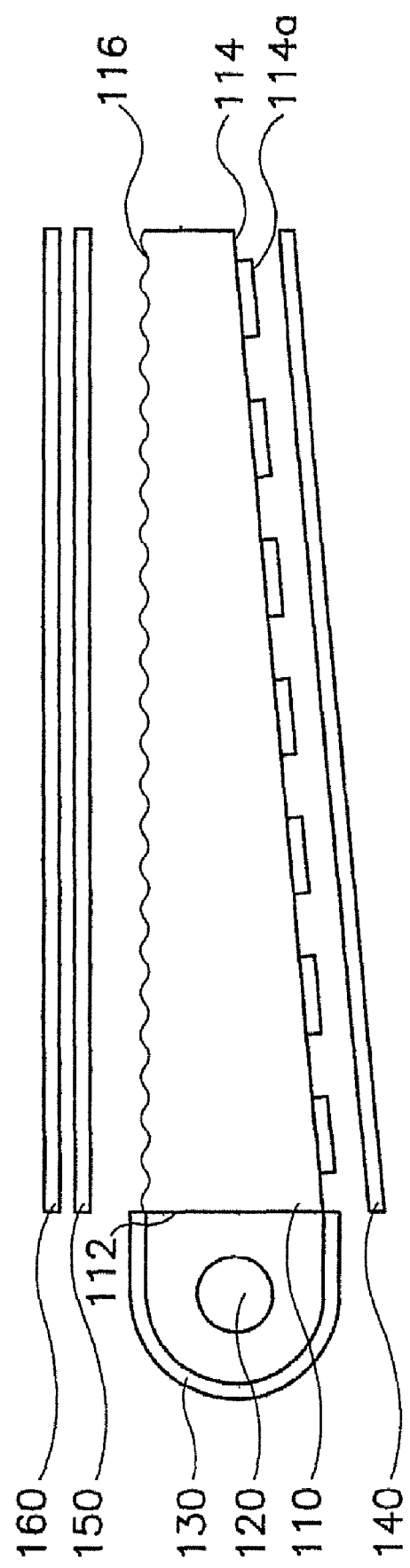
FIG. 3 is a view showing a backlight assembly according to one exemplary embodiment of the present invention.

FIG. 3 is a view showing a backlight assembly according to one exemplary embodiment of the present invention.

Referring to FIG. 3, a backlight assembly according to the present invention includes a light guiding plate 110, a lamp (lamps) 120, a lamp reflector 130, a reflection sheet 140, and first and second light-collecting sheets 150 and 160.

The light guiding plate 110 has a light incident surface 112 for receiving the light generated from the lamp 120, a light reflection surface 114, and a light output surface 116. A side of the light reflection surface 114 borders a first side of the light incident surface 112, and a side of the light output surface 116 borders a second side of the light incident surface 112.

The light guiding plate 110 guides a first light radiated from the lamp 120 towards the first light-collecting sheet 150. The light reflection surface 114 has a plurality of fine dots 114a, so that the fine dots 114a reflect the first light, and diffuse the first light incident into the light reflection surface 114 through the light incident surface 112 to output a second light. The light output surface 116 has a predetermined roughness, so that the light output surface 116 diffuses the second light, which is diffused and reflected by the fine dots 114a of the light reflection surface 114, to output a third light.

It is preferred that the density (per an area) of the fine dots 114a on the light reflection surface 114 increases in proportion to a distance between the fine dots 114a and the lamp 120.

The predetermined roughness of the light output surface 116 is formed by means of an embossing pattern ( ) formed on the light output surface 116. The height of the embossing pattern is preferably between about 0.63 to 1.6. As described above, a conventional diffusion sheet is disposed on a light output surface of a light guiding plate, diffuses a light emitted from the light guiding plate, and prevents a prism sheet from being closely adhered to the light output surface of the light guiding plate. However, according to the present invention, instead of providing the diffusion sheet, the light output surface 116 of the light guiding plate 110 has the predetermined roughness formed through a sand blast process, so that light output surface 116 may diffuse light and be prevented from closely adhering to the first light-collecting sheet 150 disposed above the light guiding plate 110.

In the present invention, a diameter of each of the fine dots 114a is preferably between about 30 to about 200. The conventional light guiding plate includes dots having a diameter of about 200 to about 1500 on the light reflection surface thereof. The dots are formed on the light reflection surface of the light guiding plate by using a pattern printing method or by a pattern erosion method, and hidden by the conventional diffusion sheet. However, in the present invention, since the light guiding plate 110 includes the fine dots 114a of a size about 30 to 200 on the light reflection surface 114, it is not necessary to hide the dots by using the diffusion sheet like the conventional liquid crystal display device. Thus, any problem due to the fine dots 114a may not be occurred in the liquid crystal display device according to the invention even when the diffusion sheet is removed from the liquid crystal display device.

The lamp 120 generates the first light in response to an external electric power signal applied thereto.

The lamp reflector 130 surrounds the lamp 120 to be coupled to the light guiding plate 110, and prevents the first light radiated from the lamp 120 from being leaked. That is, a part of the first light radiated from the lamp 120, which cannot be directly forwarded to the light guiding plate 110, is secondarily forwarded to the light guiding plate 110 after the first light is reflected by an inner surface of the lamp reflector 130.

The reflection sheet 140 is disposed below the light guiding plate 110, and reflects the light leaked through the light reflection surface 114 of the light guiding plate 110 towards the light guiding plate 110.

A plurality of first triangular prisms is arranged on an upper surface of the first light-collecting sheet 150, primarily collects the light radiated from the light guiding plate 110 so as to enhance the viewing angle, and outputs the primarily corrected light to the second light-collecting sheet 160.

The second light-collecting sheet 160 is disposed above the first light-collecting sheet 150. A plurality of second triangular prisms is arranged on an upper surface of the second light-collecting sheet 160. The second light-collecting sheet 160 receives the primarily collected light to output a secondarily collected light so as to enhance the viewing angle. Preferably, a plurality of beads is interposed in the second light-collecting sheet 160, so that a conventional protection sheet disposed on an upper portion of a conventional prism sheet may be removed. For example, the conventional protection sheet may be removed because a plurality of beads having a size of about 4.5 to about 5.5, preferably about 5, is interposed in a bottom surface of the second light-collecting sheet 160. The second triangular prisms are formed on the upper surface of the second light-collecting sheet 160, but the second triangular prisms are not formed on the bottom surface of the second light-collecting sheet 160.

If the first triangular prisms are arranged on the first light-collecting sheet 150 in a first direction, the second triangular prisms are preferably arranged on the second light-collecting sheet 160 in a second direction. Preferably, the second direction forms a predetermined angle, for example about 90°, with respect to the first direction. Accordingly, the light emitted from the light guiding plate 110 may be transversely and longitudinally collected, so that it is possible to sufficiently enhance the viewing angle.

Although the present invention has been described with reference to a wedge type backlight assembly having a lamp at one side of the light guiding plate 110, the present invention also may employ a flat type backlight assembly having lamps at both sides of the light guiding plate 110.

Hereinafter, a method of manufacturing the light guiding plate according to one exemplary embodiment of the present invention will be described.

First, a sample for fabricating molding pattern is prepared in a clean room in which a sand blast process is carried out.

Then, silicon particles are sprayed onto an entire surface of the sample with high-pressure and high-speed. As a result, the silicon particles collide with the surface of the sample, thereby forming the embossing pattern on the surface of the sample. The silicon particles are sprayed towards the sample through a nozzle to which a predetermined pressure is applied.

A size of the embossing pattern, or a height of the embossing pattern formed on the surface of the sample is between about 0.63 and about 1.6. The height of a certain embossing pattern formed on the surface of the sample may be below about 0.63 or above about 1.6. However, the pressure applied to the nozzle may be varied, and a force, which is applied to the surface of the sample when the silicon particles collide with the surface of the sample, may be adjusted, thereby maintaining the height of the embossing pattern in a range of about 0.63 and about 1.6.

In the above manner, the light guiding plate is gone through an injection-molding process by means of the molding pattern having a predetermined surface roughness, so that the light guiding plate has an embossing pattern of the size identical to the size of the embossing pattern formed in the molding pattern.

Then, a fine dot pattern is formed on the reflection surface of the light guiding plate. The fine dot pattern is formed on the bottom surface of the light guiding plate, to which the embossing pattern is not formed, through another pattern generating method different from the pattern printing process. The diameter of the fine dot in the fine dot pattern is preferably between about 30 to about 200. The fine dot pattern may be formed on the light reflection surface through the pattern generating method different from the pattern printing process after the embossing pattern having the predetermined roughness is formed on the light output surface of the light guiding plate. However, the fine dot pattern may be formed on the light reflection surface through the pattern generating method different from the pattern printing process before the embossing pattern having the predetermined roughness is formed on the light output surface of the light guiding plate.

In addition, the light guiding plate according to one embodiment of the present invention may be fabricated through a rolling process. For example, an external surface of a first roller has a pattern for forming the fine dot pattern on the light reflection surface of the light guiding plate, and an external surface of a second roller has a pattern for forming the embossing pattern on the light output surface of the light guiding plate. Therefore, the fine dot pattern and the embossing pattern having the predetermined roughness may be formed on the light reflection surface and the light output surface of the light guiding plate, respectively, through one process.

The reason for forming the embossing pattern having the predetermined roughness on the light output surface of the light guiding plate is as follows.

Referring to FIG. 3, the backlight assembly according to the present invention does not employ a diffusion plate but employs the first and second light-collecting sheets 150 and 160 and the embossing pattern on the light output surface 116 of the light guiding plate 110, in order to scatter the light emitted from the light guiding plate 110 to output the light having uniform brightness distribution.

Thus, the first light-collecting sheet 150, which primarily collects the light emitted from the light guiding plate 110 in a first predetermined direction to enhance the viewing angle, directly contacts with the upper surface of the light guiding plate 110. The second light-collecting sheet 160, which collects light in a second predetermined direction different from the first predetermined direction, is placed on the upper surface of the first light-collecting sheet 150. The embossing pattern formed on the light output surface 116 of the light guiding plate 110 prevents the light guiding plate 110 from closely making contact with the first light-collecting sheet 150.

In addition, the embossing pattern diffuses the light emitted from the light guiding plate 110 in a form of a surface light source, thereby allowing the light to have uniform brightness distribution.

Thus, the backlight assembly according to the present invention may output the light having uniform brightness distribution without employing the diffusion sheet.

Hereinafter, a method for generating light through the backlight assembly according to the present invention will be described.

Firstly, when the lamp is switched on, light is incident into the light guiding plate through the light incident surface. The light is repeatedly reflected between the light reflection surface and the light output surface, and reaches an end of the light guiding plate. The light is diffused and reflected through the light reflection surface by means of the fine dot pattern. In addition, the light is diffused at the light output surface by means of the embossing pattern having the predetermined roughness, and is emitted from the light guiding plate. The light emitted from the light guiding plate is primarily collected by means of the first light-collecting sheet. The light, which is primarily collected by the first light-collecting sheet, is secondarily collected by means of the second light-collecting sheet, and then is emitted through the second light-collecting sheet.

Figure 4:
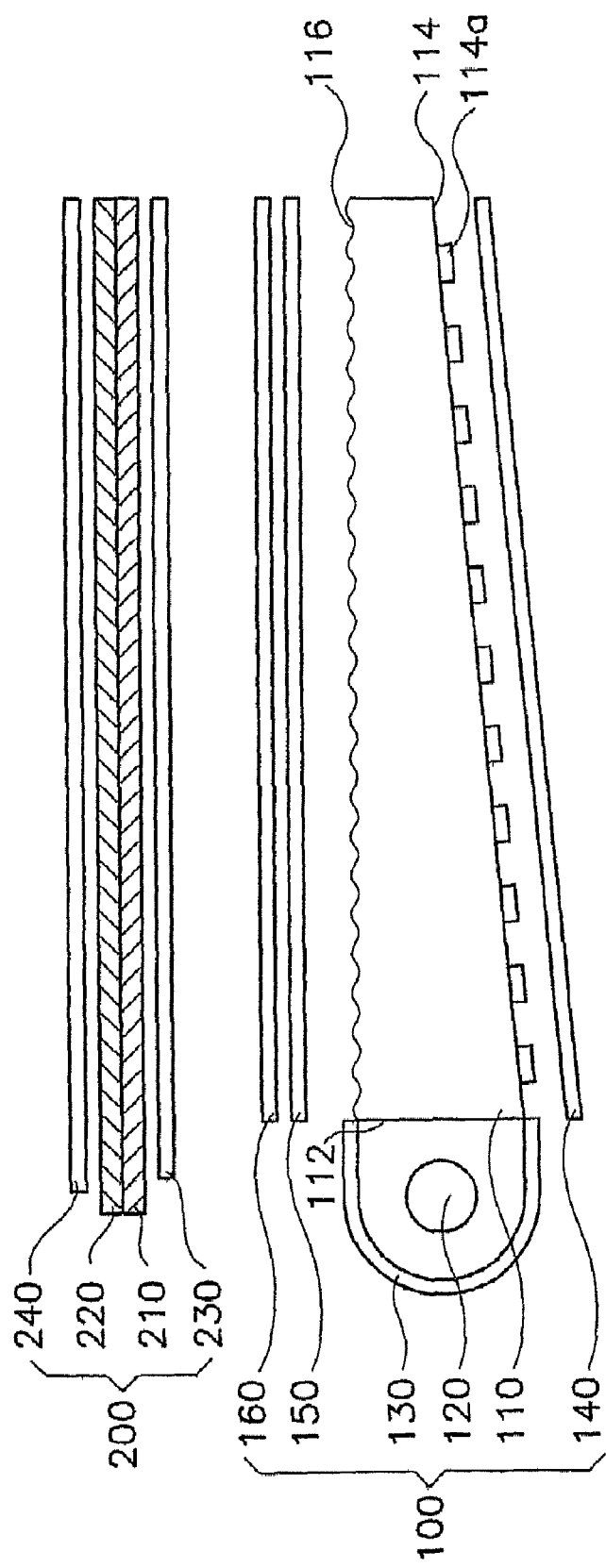
FIG. 4 is a view showing a liquid crystal display device according to one exemplary embodiment of the present invention.

FIG. 4 is a view showing a liquid crystal display device according to one exemplary embodiment of the present invention.

Referring to FIG. 4, a liquid crystal display device according to one embodiment of the present invention includes a backlight assembly 100 for converting a line light source into a surface light source to radiate light, and a liquid crystal display panel 200 for displaying images based on the surface light source.

The back light assembly 100 includes the light guiding plate 110, the lamp 120, the lamp reflector 130, the reflection sheet 140, and the first and second light-collecting sheets 150 and 160. The backlight assembly 100 converts the line light source into the surface light source, and supplies light to the liquid crystal display panel 200. Since the backlight assembly 100 has been described in FIG. 3, it will not be further described below.

The liquid crystal display panel 200 includes a lower substrate 210 called as "array substrate", an upper substrate 220 called as "a color filter substrate", and liquid crystal disposed between the lower substrate 210 and the upper substrate 220. The liquid crystal display panel 200 displays images in response to the light supplied from the backlight assembly 100. It is preferred that a first polarized plate 230 is disposed below the lower substrate 210 and a second polarized plate 240 is disposed above the upper substrate 220.

As described above, according to the present invention, the fine dot pattern is formed on the light reflection surface of the light guiding plate, and the light output surface of the light guiding plate is gone through the sand blast process, so that the number of optical sheets may be reduced. Thus, only two optical sheets are required instead of four optical sheets. Also, the liquid crystal display device may be fabricated to have a lighter weight, thinner thickness and compacter size. In addition, beads are coated on a top light-collecting sheet of light-collecting sheets disposed above the light guiding plate, so that the protection sheet may be removed.

While the present invention has been described in detail with reference to the preferred embodiments thereof, it should be understood to those skilled in the art that various changes, substitutions and alterations can be made hereto without departing from the scope of the invention as defined by the appended claims.

What is claimed is:

1. A backlight assembly comprising:
   a light generating part for generating a first light;
   a light guiding member including:
      a light incident surface to receive the first light generated from the light generating part;
      a light reflection surface having a plurality of dots, wherein each dot has a diameter, the plurality of dots diffuse and reflect the first light emitted from the light incident surface to output a second light;
      a light output surface having an embossing pattern having a height of about 0.63 μm to about 1.6 μm with a predetermined roughness, the light output surface diffuses the second light; and
      a brightness controlling member, disposed above the light guiding member, to control brightness of the second light guided by the light guiding member.

2. The backlight assembly as claimed in claim 1, further comprising a reflecting member, disposed below the light guiding member to reflect the second light leaked from the light guiding member towards the light guiding member.

3. The backlight assembly as claimed in claim 1, wherein the plurality of dots each have a diameter between about 30 μm to about 200 μm.

4. The backlight assembly as claimed in claim 3, wherein a density of the dots on the light reflection surface increases in proportion to a distance between the dots and the light generating part.

5. The backlight assembly as claimed in claim 1, wherein the brightness controlling member includes at least one light-collecting sheet for collecting the second light guided by the light guiding member.

6. The backlight assembly as claimed in claim 5, wherein the light-collecting sheet includes a plurality of triangular prisms on an upper surface of the light-collecting sheet.

7. The backlight assembly as claimed in claim 6, wherein a bottom one of the light-collecting sheets contacts with the embossing pattern formed on the light output surface of the light guiding member.

8. The backlight assembly as claimed in claim 6, wherein the brightness controlling member includes first and second light-collecting sheets, and wherein first triangular prisms formed on the first light-collecting sheet are arranged in different directions from second triangular prisms formed on the second light-collecting sheet.

9. The backlight assembly as claimed in claim 5, wherein the brightness controlling member includes a plurality of the light-collecting sheets, and wherein the brightness controlling member further includes a bead coating layer formed on a bottom surface of a top one of the light-collecting sheets.

10. The backlight assembly as claimed in claim 9, wherein the bead coating layer includes at least one bead having a size of about 4.5 μm to about 5.5 μm.

11. A liquid crystal display device comprising:
    a backlight assembly including:
       a light guiding member having a bottom surface, an upper surface, a plurality of dots formed on the bottom surface, wherein each dot has a diameter, and an embossing pattern having a height of about 0.63 μm to about 1.6 μm and being formed on the upper surface;
       a reflection sheet, disposed below the light guiding member, for reflecting a first light passed through the light guiding member towards the light guiding member; and
       an optical sheet, disposed above the light guiding member, for controlling a path of a second light guided by the light guiding member; and
    a liquid crystal panel assembly for displaying an image in response to a third light emitted from the backlight assembly, the liquid crystal panel assembly including a first substrate, a second substrate facing the first substrate and liquid crystal disposed between the first and the second substrates.

12. The liquid crystal display device as claimed in claim 11, wherein the optical sheets include at least one light-collecting sheet for collecting the second light guided by the light guiding member.

13. The liquid crystal display device as claimed in claim 12, wherein the optical sheet of the backlight assembly has no diffusion sheet for diffusing the second light.

* * * * *